(12) United States Patent
Cabouillet et al.

(10) Patent No.: US 12,252,050 B2
(45) Date of Patent: Mar. 18, 2025

(54) METHOD FOR PRODUCING A SEAT SUPPORT ELEMENT

(71) Applicant: Faurecia Sièges d'Automobile, Nanterre (FR)

(72) Inventors: Anne-Sophie Cabouillet, Boissy-le-Sec (FR); Fabrice Etienne, Bavilliers (FR); Pierre Fichet Delavault, Montrouge (FR); Davy Phomsavanh, Bourg-la-Reine (FR)

(73) Assignee: Faurecia Sièges d'Automobile, Nanterre (FR)

( * ) Notice: Subject to any disclaimer, the term of this patent is extended or adjusted under 35 U.S.C. 154(b) by 269 days.

(21) Appl. No.: 17/217,629

(22) Filed: Mar. 30, 2021

(65) Prior Publication Data

US 2021/0300221 A1 Sep. 30, 2021

(30) Foreign Application Priority Data

Mar. 31, 2020 (FR) .................................... 20 03183

(51) Int. Cl.
*B60N 2/70* (2006.01)
*B29C 33/56* (2006.01)
(Continued)

(52) U.S. Cl.
CPC ............ *B60N 2/7017* (2013.01); *B29C 33/56* (2013.01); *B29C 65/70* (2013.01); *B29C 66/71* (2013.01); *B29C 66/727* (2013.01); *B60N 2/5891* (2013.01); *D06N 3/14* (2013.01); *B29K 2075/00* (2013.01); *B29K 2105/04* (2013.01); *B29K 2995/0097* (2013.01); *D06N 2207/06* (2013.01);
(Continued)

(58) Field of Classification Search
CPC .................................................... B60N 2/7017
See application file for complete search history.

(56) References Cited

U.S. PATENT DOCUMENTS 5,662,996 A * 9/1997 Jourquin ............. B29C 44/0461
264/328.18
2003/0098598 A1 5/2003 English et al.
(Continued)

FOREIGN PATENT DOCUMENTS

| EP | 3486061 A1 | 5/2019 |
| FR | 2934256 A1 | 1/2010 |

(Continued)

OTHER PUBLICATIONS

Machine translation of FR-2934256-A1 (Year: 2010).*
(Continued)

*Primary Examiner* — Kyle A Cook
(74) *Attorney, Agent, or Firm* — Reising Ethington P.C.

(57) ABSTRACT

A seat support element having an outer layer that includes an outer surface and an inner surface, a synthetic skin extending over the inner surface of the outer layer, and a first foam layer extending over the synthetic skin. A method of forming the seat support element includes the following steps: forming the outer layer by applying at least one layer of paint against a first forming surface of a forming tool, applying the synthetic skin against the inner surface of the outer layer, and applying the first foam layer against an inner surface of the synthetic skin.

19 Claims, 11 Drawing Sheets

(51) Int. Cl.
  *B29C 65/00*  (2006.01)
  *B29C 65/70*  (2006.01)
  *B60N 2/58*  (2006.01)
  *D06N 3/14*  (2006.01)
  B29K 75/00  (2006.01)
  B29K 105/04  (2006.01)

(52) U.S. Cl.
  CPC .... *D06N 2211/263* (2013.01); *D06N 2211/28* (2013.01)

(56) References Cited

U.S. PATENT DOCUMENTS

| | | | |
|---|---|---|---|
| 2005/0019544 A1 | 1/2005 | Stacey | |
| 2006/0153991 A1* | 7/2006 | Winter | B05B 7/0408 |
| | | | 264/309 |
| 2014/0191557 A1* | 7/2014 | Galbreath | B60N 2/58 |
| | | | 297/452.58 |
| 2015/0336491 A1* | 11/2015 | Abe | B60N 2/68 |
| | | | 297/452.48 |
| 2016/0167552 A1* | 6/2016 | Rigal | B60N 2/5891 |
| | | | 425/395 |
| 2016/0375808 A1* | 12/2016 | Etienne | B29C 44/08 |
| | | | 297/452.61 |
| 2018/0361897 A1* | 12/2018 | Lem | B60N 2/976 |
| 2022/0041084 A1* | 2/2022 | Itabashi | B60N 2/5891 |

FOREIGN PATENT DOCUMENTS

| | | |
|---|---|---|
| FR | 2943270 A1 | 9/2010 |
| WO | 02102585 A1 | 12/2002 |

OTHER PUBLICATIONS

French Search Report corresponding to French Application No. FR 2003183, dated Jan. 22, 2021, 2 pages.

Albert Varkki, How To Stiffen Leather To Make It Harden (DIY Methods); updated Mar. 31, 2024, 13 pages.

* cited by examiner

METHOD FOR PRODUCING A SEAT SUPPORT ELEMENT

TECHNICAL FIELD

The present invention relates to a method for producing a seat support element.

The invention also relates to a support element obtained by such a method.

BACKGROUND

Such a support element forms for example the seat or backrest of a vehicle seat. Such a support element must therefore have sufficient comfort and an appealing appearance for receiving passengers in the vehicle.

To this end, the support element is formed by a padding on which a shell is attached to form an outer surface of the support element. The shell thus gives the support element its appearance, while the padding is arranged to accommodate the seat occupant comfortably. The shell and the padding are made separately, for example by molding, and then attached to each other to form the seat support element.

Such a production method is therefore tedious and time-consuming to implement and requires a number of workstations to carry out the various steps of manufacturing the support element.

SUMMARY

One of the objects of the invention is to overcome these disadvantages by proposing a method for producing a support element that is simple and quick to implement and can be carried out in a reduced number of workstations.

To this end, the invention relates to a method for producing a seat support element comprising at least one outer layer, having an outer surface, forming an outer surface of the support element, and an inner surface, opposite the outer surface, a skin of synthetic material extending over the inner surface of the outer layer, and a first layer of foam extending over the skin of synthetic material, the method comprising the following steps:

forming the outer layer by applying at least one layer of paint against a first forming surface of a forming tool, said first forming surface having the shape of the outer surface of the support element to be formed, applying the skin of synthetic material to the inner surface of the outer layer, the skin of synthetic material being made of a water-free synthetic material, and applying the first foam layer to an inner surface of the skin of synthetic material, the first foam layer having a formulation containing water and a foaming catalyst at the time of its application to the skin of synthetic material.

Thus, the method according to an embodiment of the invention makes it possible to produce a support element having a satisfactory appearance and comfort in a single forming tool in a reduced number of steps.

According to other embodiments of the invention, the method may be carried out using any the following features considered alone or according to all technically possible combinations:

the skin of synthetic material is substantially a non-cellular polyurethane and the first foam layer is a cellular polyurethane foam;

the first layer is formed on a functional film prior to the application of the first foam layer to the synthetic skin, the assembly formed by said first foam layer and by said functional film being applied against the inner surface of the synthetic skin;

the functional film is a transfer film, the first foam layer being sprayed onto said transfer film so that an inner surface of said first foam layer extends over the transfer film, the assembly formed by the first foam layer and the transfer film being applied against the skin made of synthetic material so that an outer surface of the first foam layer extends over the inner surface of the skin made of synthetic material, the transfer film being removed after the outer surface of the first foam layer has been applied to the inner surface of the skin made of synthetic material;

a layer of a release agent is applied against the first forming surface prior to the application of the paint layer on said first forming surface;

the paint layer, the synthetic skin and/or the first foam layer are applied by spraying;

the paint layer is applied by spraying on the first forming surface and then the synthetic skin is applied by spraying on the paint layer, the first foam layer being applied by spraying on the synthetic skin or on a functional film;

the first foam layer is applied against the inner surface of the synthetic skin while said synthetic skin and/or said first foam layer are in a viscous state;

the method comprises applying a second forming surface of the forming tool on the side of an inner surface of the first foam layer, said second forming surface having the shape of an inner surface of the support element to be formed, said support element being formed between the first forming surface and the second forming surface in a closed position of the forming tool.

According to an embodiment of the invention, the support element further comprises a cover element extending over the inner surface of the first foam layer and forming the inner surface of the support element, the method comprising the following steps:

applying the cover element against the second forming surface of the forming tool prior to closing the forming tool, closing the forming tool so as to apply the cover element against the first foam layer in a viscous state so as to bond the cover element and the first foam layer in the forming tool.

Thus, according to this embodiment, the production method of the invention further enables, in a single operation cycle of the forming tool, improving the appearance of the support element by attaching a cover element to the body of the support element so that its inner surface has a satisfactory appearance.

According to other aspects of this embodiment of the invention, the method may be carried out using any of the following features considered in isolation or in any technically conceivable combination:

the cover element comprises at least one coating layer of a textile material, skin or synthetic material, said coating layer forming the inner surface of the support element;

the method comprises a step of forming the cover element before it is applied to the second forming surface of the forming tool, in which a second foam layer is applied to a substrate and is then bonded to an outer surface of the coating layer, the assembly formed by the substrate, the second foam layer and the coating layer being shaped to substantially conform to the shape of the inner surface of the support element and then being placed against the second forming surface of the forming tool, the substrate being removed prior to the application of the second foam layer to the first foam layer;

the second foam layer is in a viscous state during the forming of the assembly formed by the substrate, the second foam layer and the coating layer and during the application of the second foam layer on the first foam layer;

the cover element is held against the second forming surface of the forming tool by suction against the second forming surface and/or the outer layer is held against the first forming surface by suction against the first forming surface;

a functional element is placed in the forming tool so as to extend into the first foam layer and/or between the first foam layer and the cover element when the forming tool is closed;

the functional element is a suspension frame extending into the first foam layer, said suspension frame being attached to the first forming surface prior to the application of the first foam layer to the inner surface of the synthetic skin;

the functional element is a film forming at least one pocket defining an inner volume, said film extending between the first foam layer and the cover element, said film comprising an opening to the exterior of the seat support element and being in fluid communication with the pocket so that the pocket can be inflated by introducing air into the internal volume through the opening.

According to another aspect, the invention also relates to a seat support element comprising at least one outer layer, having an outer surface, forming the outer surface of the support element, and an inner surface, opposite the outer surface, and a body extending over the inner surface of the outer layer, the body comprising at least one synthetic skin extending against the inner surface of the outer layer, the synthetic skin being made of a water-free material, and a first foam layer extending against the inner surface of the synthetic skin, the first foam layer having a water-containing formulation.

According to another embodiment of the support element, the support element further comprises a cover element extending over the inner surface of the body and forming the inner surface of the support element.

BRIEF DESCRIPTION OF THE DRAWINGS

Further aspects and advantages of the invention will become apparent from the following description, given by way of example and made with reference to the appended drawings, in which.

DETAILED DESCRIPTION

Figure 1:
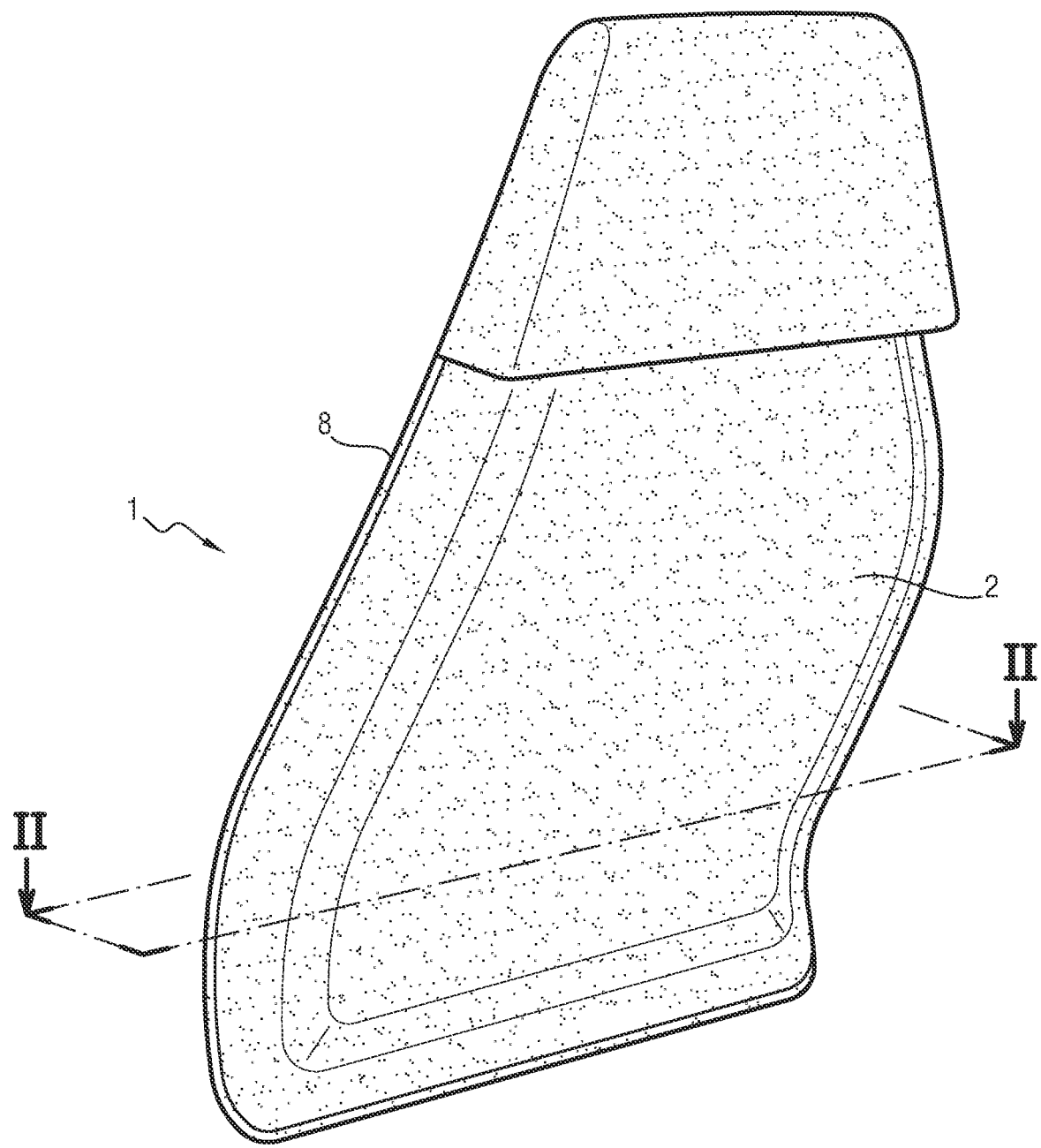
FIG. 1 is a schematic perspective representation of a support element according to an embodiment of the invention, seen from the side of the outer surface of the support element.
Figure 2:
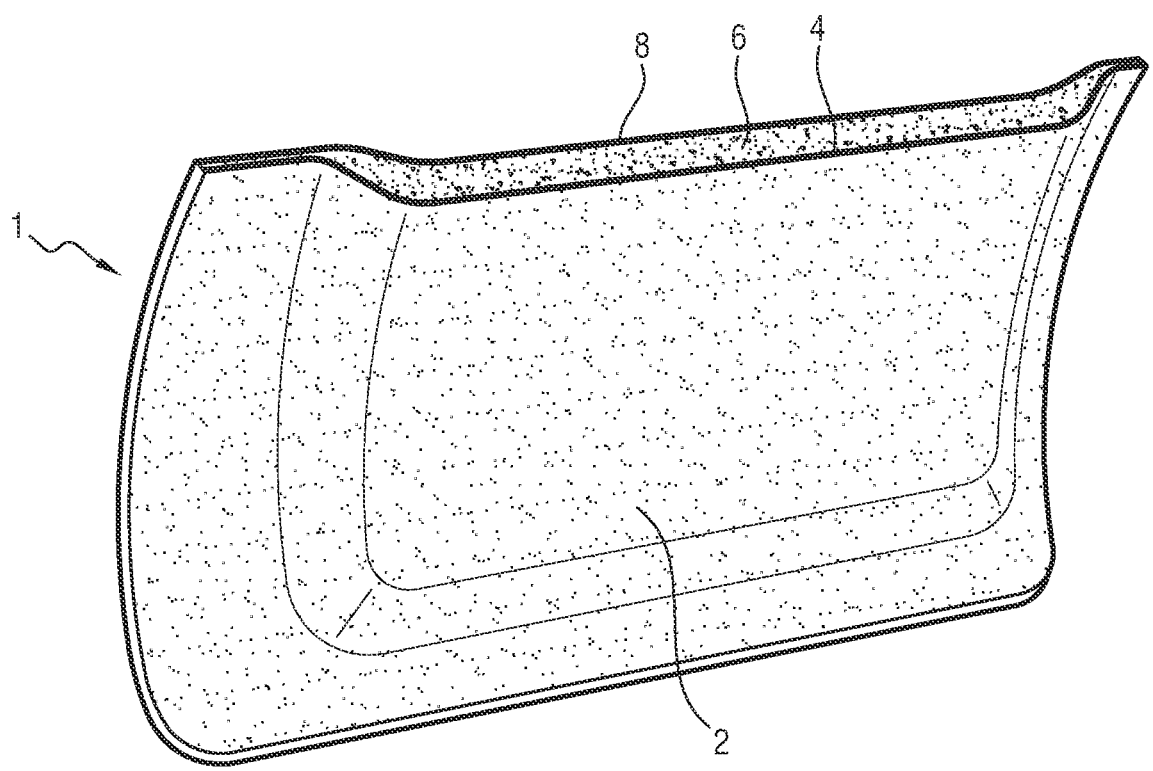
FIG. 2 is a schematic representation of the support element sliced at the axis II-II of FIG. 1, FIGS. 3 to 5 are schematic cross-sectional representations of different steps in the production method of a support element according to an embodiment of the invention.

With reference to FIGS. 1 and 2, a vehicle seat support element 1 comprising at least an outer layer 2, a synthetic skin 4 and a first foam layer 6 is described. According to a particular embodiment that will be described in more detail later, the support element 1 further comprises a cover element 8.

The support element 1 is for example intended to form a backrest, as shown in FIG. 1. Alternatively, the support element 1 could be adapted to form a seat cushion. Such a support element 1 comprises an inner surface, intended to form a support surface for an occupant of the seat, and an outer surface, opposite to the inner surface, and forming a surface that is not intended to form a support surface for an occupant of the seat. According to the embodiment shown in the figures, the outer surface is a surface that is at least partially visible from outside the seat. In the following description, the term "inner" refers to that which faces the inner surface of the support element 1 and the term "outer" refers to that which faces the outer surface of the support element 1.

The outer layer 2 forms the outer surface of the support element 1. Thus, in the case of a backrest, the outer surface forms the back of the backrest, opposite the surface intended to accommodate a passenger. Opposite the outer surface, the outer layer 2 defines an inner surface 10, not visible from the outside of the support element 1.

The outer layer 2 is formed by at least one layer of paint, conferring a particular aspect to the outer surface of the support element 1, in particular by choosing the color and the gloss of the paint layer. The paint layer is, for example, a water-based paint or a solvent-based paint. The outer layer 2 has, for example, a thickness comprised between 5 μm and 120 μm, preferably between 10 μm and 80 μm, for example about 25 μm. It is understood that the outer layer 2 may comprise several layers of paint and/or varnish, depending on the desired appearance of the outer layer 2 and its properties. For example, the outer layer 2 may have anti-abrasive, wear resistance, light resistance, chemical resistance properties, etc. The outer layer 2 may also have a pattern, such as an embossing, logo or the like, which pattern may be formed on the outer layer 2 during the production of the support element 1, as will be described later.

The synthetic skin 4 extends over the inner surface 10 of the outer layer 2 and forms a support for the outer layer 2 by adhering to it. The synthetic skin 4 has an outer surface 12, extending over the inner surface 10 of the outer layer 2, and an inner surface 14, opposite the outer surface 12. The synthetic skin 4 forms a substantially rigid or semi-rigid shell of the support element 1.

For this purpose, the synthetic skin 4 is formed from a water-free synthetic material. More particularly, the synthetic skin 4 is similar to a non-cellular, i.e., cell-free, foam layer. In other words, the synthetic skin does not contain air bubbles, which gives it a certain rigidity. It should be noted that the synthetic skin 4 may contain residual air bubbles, the presence of which is due to the method for applying the synthetic skin 4 that will be described later.

The synthetic skin 4 is for example made of an elastomeric material, for example a material resulting from a polyol-isocyanate reaction. According to one embodiment, the synthetic skin 4 is made of substantially non-cellular, water-free polyurethane. Thus, the synthetic skin 4 exhibits a behavior similar to a textile coated with a synthetic material (TEP) or imitation leather.

For example, the synthetic skin 4 has a thickness comprised between 0.1 mm and 3 mm, preferably between 0.5 mm and 2 mm. It should be noted that the synthetic skin 4 can have a variable thickness depending on the desired characteristics, particularly in terms of rigidity, for the shell of the support element. The synthetic skin 4 has, for example, a density comprised between 400 kg·m-3 and 1500 kg·m-3, preferably between 800 kg·m-3 and 1200 kg·m-3. The synthetic skin 4 has, for example, a tensile strength comprised between 1 Mpa and 50 Mpa, preferably between 3 Mpa and 15 Mpa, measured according to the DIN EN ISO 527-3/2/100 standard. The synthetic skin 4 has, for example, a tear strength comprised between 0.5 N·mm-1 and 30 N·mm-1, preferably greater than 4 N·mm-1, more preferably greater than 6 N·mm-1, measured according to the DIN EN ISO 13937-2 method.

The first foam layer 6 extends over the inner surface 14 of the synthetic skin 4 and adheres to it. The first foam layer 6 has an outer surface 16, extending over the inner surface 14 of the synthetic skin 4, and an inner surface 18, opposite the outer surface 14. The first foam layer 6 forms a padding of the support element 1 and thus has a certain flexibility.

For this purpose, the first foam layer 6 is made of a synthetic material having a water-containing formulation. More particularly, the first foam layer 6 is a cellular foam layer, i.e., a foam layer containing air bubbles. These cells are obtained during the chemical reaction to obtain the first foam layer 6 as will be described later.

The first foam layer 6 is, for example, made of an elastomeric material, for example a material resulting from a polyol-isocyanate reaction using a foaming catalyst. According to one embodiment, the first foam layer 6 is made of a polyurethane foam containing water.

The first foam layer 6 has a thickness comprised between 1 mm and 15 mm, preferably between 4 mm and 9 mm. It should be noted that the first foam layer 6 may have a variable thickness depending on the desired characteristics, particularly in terms of flexibility, of the support element padding. The first foam layer 6 has a rigidity comprised between 3 N/30 mm and 45 N/30 mm, preferably between 3 N/30 mm and 25 N/30 mm.

A support element 1 as described above has a satisfactory appearance on the side of its outer surface and is suitable for accommodating a passenger on the padding side. The production method such a support element will now be described with reference to FIGS. 3 to 5.

The support element 1 is made in a forming tool 20 shown in FIGS. 3 to 8 to obtain a finished support element at the exit of the forming tool 20.

Figure 4:
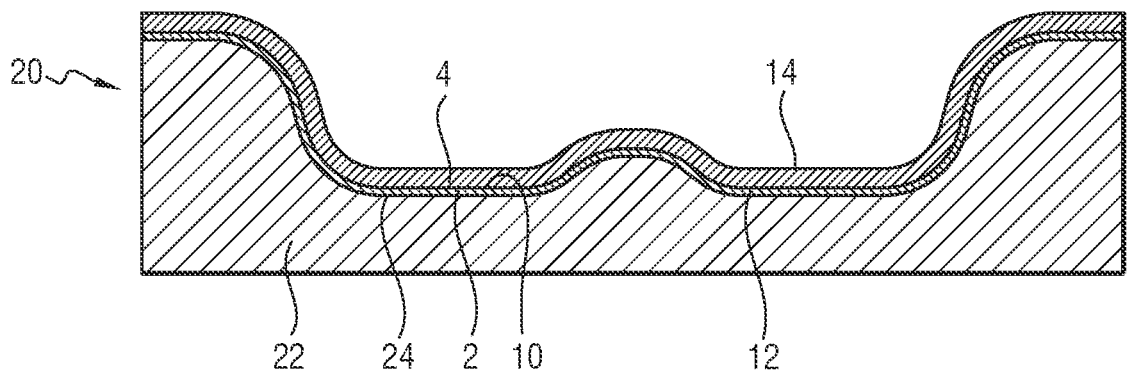
Figure 5:
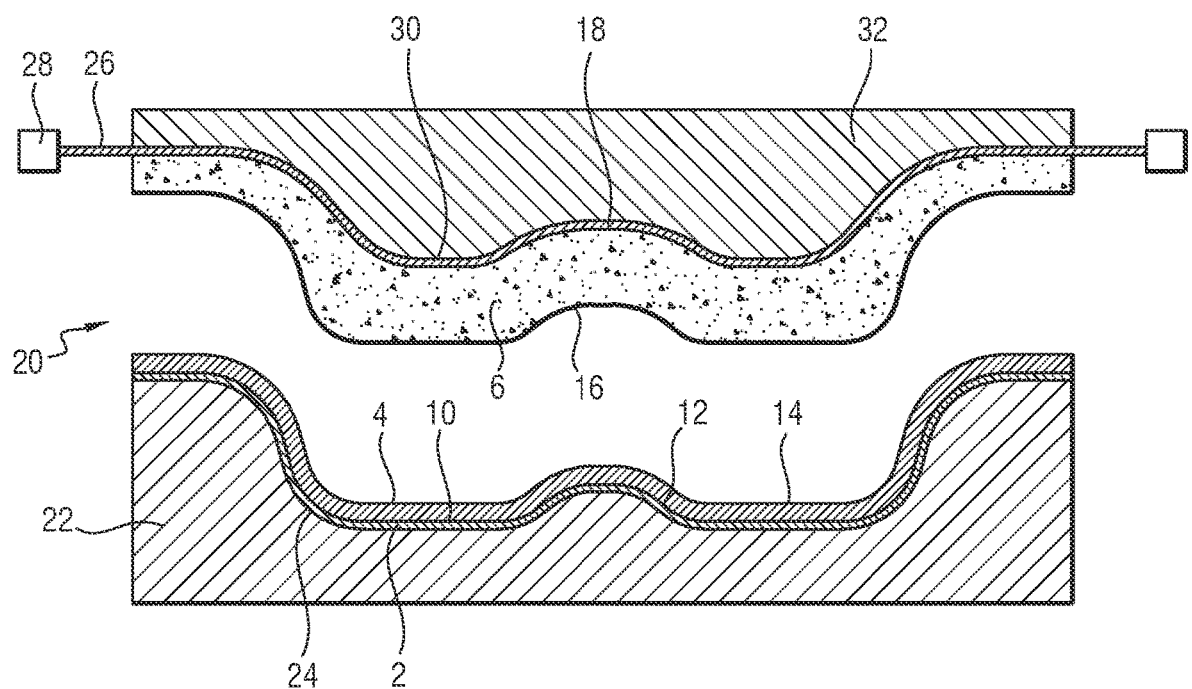

The forming tool 20 comprises at least a first part 22 defining a first forming surface 24 having the shape of the outer surface of the support element 1 to be produced. As such, the shape of the first forming surface 24 shown in FIGS. 3 to 5 is only given as an example and other shapes may be considered, as shown for example in FIGS. 6 to 8.

In addition, the first forming surface 24 may be arranged to apply a particular appearance to the outer surface of the support element 1, for example by having a localized graining and/or pattern, such as a logo or the like, protruding from the first forming surface 24 or extending in hollow in the first forming surface 24.

The various steps of the method described below may be performed while the forming tool 20 is heated, including the first forming surface 24, for example to a temperature of about 70° C.

Figure 3:
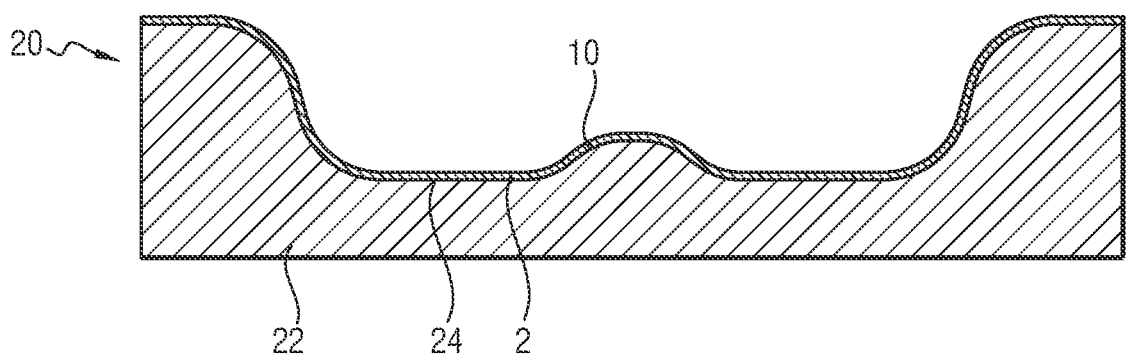

The outer layer 2 is made by applying at least one layer of paint to the first forming surface 24 so that the outer layer 2 adopts the shape of the first forming surface 24, as shown in FIG. 3. The application of the layer of paint is done by spraying, for example. When the outer layer 2 comprises several layers of paint and/or varnish, these are applied successively to the first forming surface 24 from the outside inwards, i.e., the layer forming the outer surface, for example a varnish layer, is first applied to the first forming surface 24 and then the layer lying immediately against this first layer, for example a paint layer defining the color of the outer surface, is applied against the first layer lining the first forming surface 24. The heating of the first forming surface 24 results in a rapid drying of the outer layer 2.

According to one embodiment, a release agent is first applied to the first forming surface 24 prior to the production of the outer layer 2, and the paint and/or varnish layer(s) are applied to the release agent lining the first forming surface 24. Such a release agent is sprayed onto the first forming surface 24 for example, and facilitates the removal of the support element 1 made from the forming tool 20, as will be described later.

The synthetic skin 4 is then applied against the inner surface 10 of the outer layer 2, as shown in FIG. 4. The synthetic skin 4 is applied, for example, by spraying the water-free material forming the synthetic skin 4 against the inner surface 10 of the outer layer 2, for example, while the outer layer 2 is not yet dry in order to ensure adhesion between the synthetic skin 4 and the outer layer 2. The material of the synthetic skin 4 is kept in a viscous state after its application and before the application of the first foam layer 6, for example by heating the first part 22 of the forming tool 20.

The first foam layer 6 is then applied to the inner surface 14 of the synthetic skin 4.

According to the embodiment shown in FIG. 5, the first foam layer 6 is previously formed on a functional film 26 before being applied with the functional film 26 to the inner surface 14 of the synthetic skin 4. The functional film 26 is, for example, a transfer film, a mechanical reinforcement web, a thermal web or the like. The application of the foam layer 6 to the functional film 26 is done, for example, while the functional film 26 is stretched in a frame 28 by applying a foam precursor material on one side of the functional film 26. The foam precursor material is used to form the first foam layer 6 by chemical reaction, including by means of a foaming catalyst, as previously described. The foaming catalyst is different from water, as the foam precursor material formulation already contains water. The chemical reaction between the foam precursor material and the catalyst creates a cellular foam on the face of the functional film 26 and then the assembly formed by the first foam layer 6 and the functional film 26 is applied to the inner surface 14 of the synthetic skin 4 while the foam layer 6 is in a viscous state. The foam precursor material is sprayed onto the functional film 26, for example. When the functional film 26 is, for example, a transfer film, intended to be removed after the first foam layer 6 has adhered to the synthetic skin 4, the inner surface 18 of the first foam layer 6 is applied to the functional film 26, as shown in FIG. 5, and the outer surface 16 of the first foam layer 6 is applied to the inner surface 14 of the synthetic skin 4. Alternatively, for a functional film 26 other than a transfer film, the functional film 26 may extend over the outer surface 16 of the first foam layer 6 and be applied to the inner surface 14 of the synthetic skin 4 so as to be permanently fixed in the support element 1. In any case, the application being made while the synthetic skin 4 is in a viscous state, adhesion is ensured between the first foam layer 6, also in a viscous state, or with the functional film 26.

According to the embodiment shown in FIG. 5, the assembly formed by the first foam layer 6 and the functional film 26 is pre-formed before the application to the inner surface 14 of the synthetic skin to acquire the shape of the inner surface of the support element 1. In this case, this assembly is placed against a second forming surface 30 of a second part 32 of the forming tool 20, the second forming surface 30 having the shape of the inner surface of the support element 1 to be formed. Thus, at least the inner surface 18 of the first foam layer 6 acquires the shape of the inner surface of the support element 1. Like the first part 22, the second part 32 can be heated.

The support element 1 is then made by approaching the second part 32 of the forming tool towards the first part 22, so as to make the assembly formed by the first foam layer 6 and the functional film 26 adhere to the inner surface 14 of the synthetic skin 4. After the synthetic skin 4 and the first foam layer 6 have cooled and hardened, the support element 1 forms a coherent assembly in which the padding and the shell are attached to each other, as shown in FIGS. 1 and 2. The first and second parts 22, 32 of the forming tool 20 can be separated and the support element 1 can be removed from the forming tool 20, this being facilitated when a release agent has been applied to the first forming surface 24. When the functional film 26 is a transfer film, it is removed from the inner surface 18 of the first foam layer 6 after the outer surface 16 of the first foam layer 6 has been applied to the inner surface 14 of the synthetic skin 4. The support element 1 can then be used in a seat or undergo an additional operation of attaching a cover element 8. This operation may be performed outside of the forming tool 20, but advantageously may be performed within the forming tool 20, as will be described later.

In a variant of the embodiment of FIG. 5, the assembly formed by the first foam layer 6 and the functional film 26 is first applied to the inner surface 14 of the synthetic skin 4, and then the second part 32 is brought closer to the first part 22 so as to apply the second forming surface 30 to the inner surface of the assembly in order to shape it and so as to bond this assembly to the synthetic skin 4.

Figure 6:
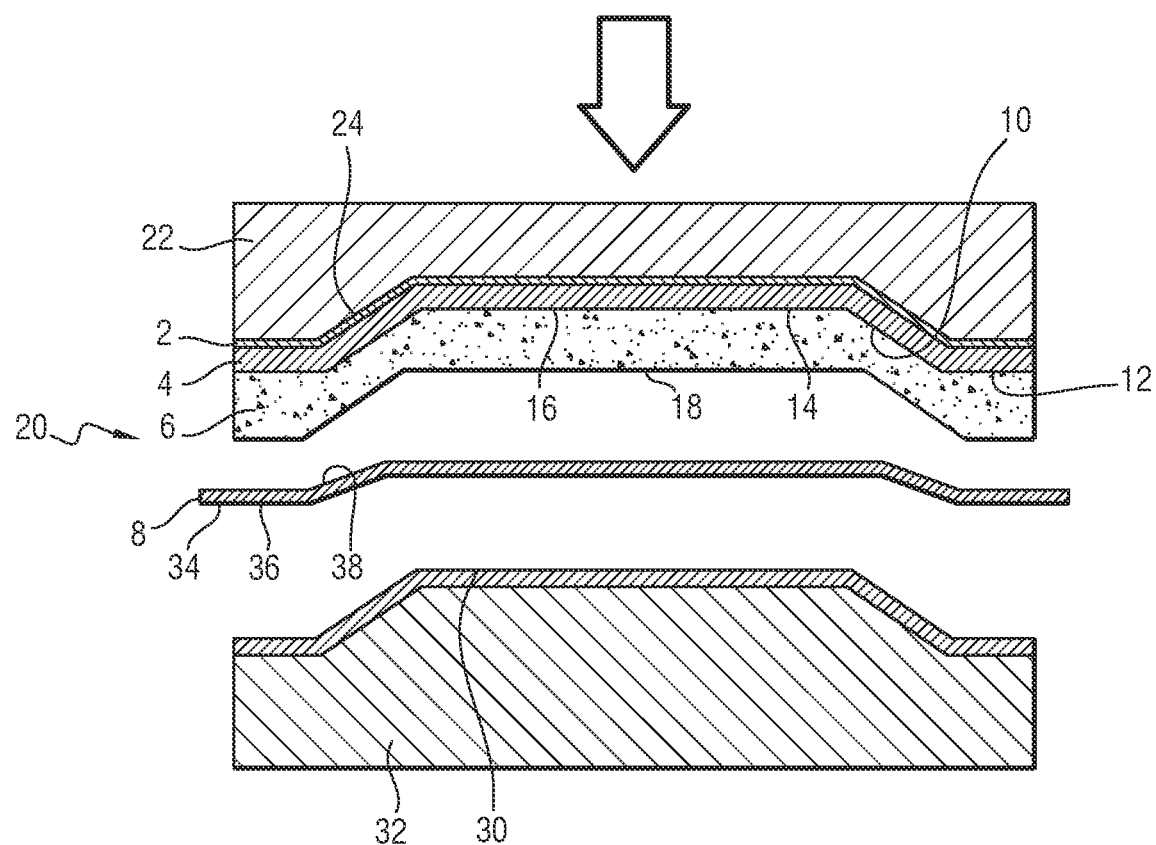
FIG. 6 is a schematic cross-sectional representation of a step for producing a support element according to a particular embodiment of the invention.
Figure 7:
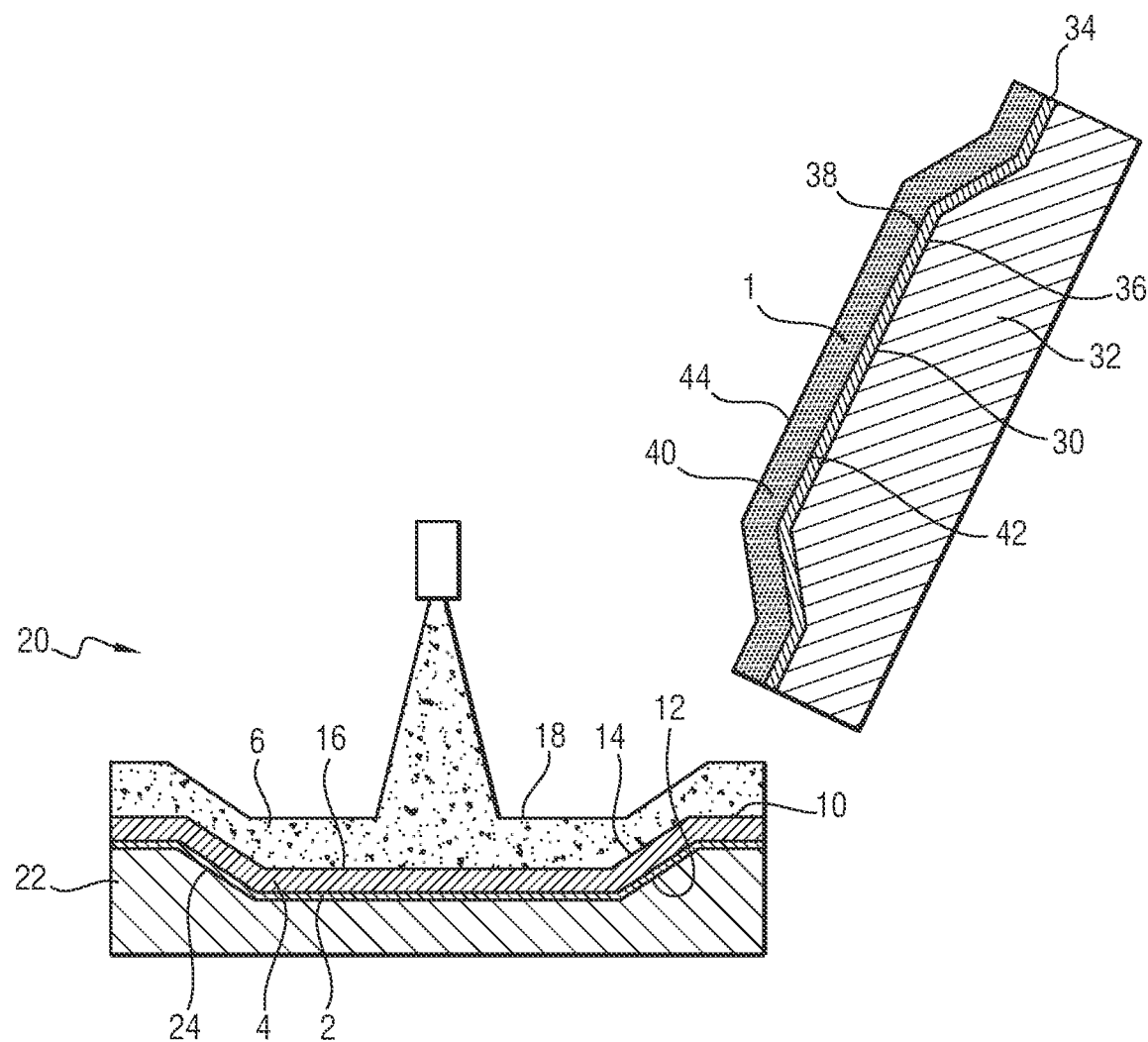
FIGS. 7 and 8 are schematic cross-sectional representations of steps for producing a support element according to an alternative embodiment of FIG. 6.

According to still another embodiment, for example when the use of a functional film 26 is not intended, the first foam layer 26 is applied directly to the inner surface 14, for example by spraying, as shown in FIG. 7. The second forming surface 30 can then be applied to the inner surface 18 of the first foam layer 6, either directly or with a cover element 8 interposed between the second forming surface 30 and the inner surface 18 of the first foam layer 6, as will now be described with reference to FIGS. 6 to 8.

According to the embodiment shown in FIG. 6, the cover element 8 is formed by a coating layer 34 made of textile, skin or synthetic material and comprising an inner surface 36, forming the inner surface of the support element 1, and an outer surface 38, opposite to the inner surface 36. It is understood that the coating layer 34 may be formed of a plurality of layers of textile, skin or synthetic material superimposed on each other.

According to this embodiment, the coating layer 34, more particularly its inner surface 36, is arranged against the second forming surface 30 of the second part 32 of the forming tool 20 prior to closing the forming tool so that the outer surface 38 of the coating layer 34 is applied to the inner surface 18 of the first foam layer 6 while the latter is in a viscous state when the forming tool 20 is closed, i.e., when the first and the second parts 22, 32 of the forming tool are applied against each other. If closing the forming tool involves turning the first forming tool portion 22 over, as shown in FIG. 6, the outer layer 2, the synthetic skin 4 and the first foam layer 6 may be held against the first forming surface 24 by suction against this first forming surface 24. Similarly, the cover element 8 may be held against the second forming surface 30 by suction against the second forming surface 30.

According to the embodiment shown in FIG. 6, the coating layer 34 is arranged in a flexible state in the forming tool 20 and adopts the desired shape by being applied against the second forming surface 30 and against the inner surface 18 of the first foam layer 6 and optionally by heating and then cooling the coating layer 34 in the forming tool. Alternatively, the coating layer 34 may be pre-formed, for example in an intermediate forming tool, different from the forming tool 20, so that it has the desired shape when arranged against the second forming surface 32.

Figure 8:
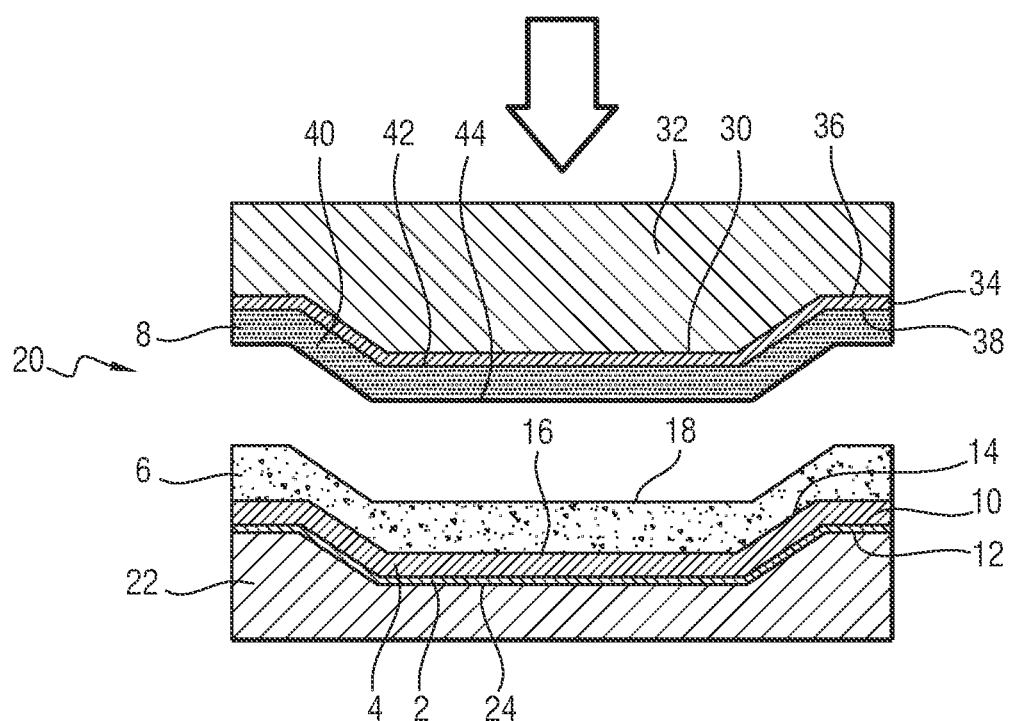

According to the embodiment of FIGS. 7 and 8, the cover element 8 further comprises a second foam layer 40 extending over the outer surface 38 of the coating layer 34. More specifically, the second foam layer 40 comprises an inner surface 42, applied to the outer surface 38 of the coating layer 34, and an outer surface 44, opposite the inner surface 42, applied against the inner surface 18 of the first foam layer 6 when the cover element 8 is applied over the first foam layer 6, or against the functional film 26 when the latter remains present. The second foam layer 40 is, for example, made of a material similar to that of the first foam layer 6. For example, the second foam layer 40 is made of cellular polyurethane. The second foam layer 40 has, for example, a thickness that is similar to that of the first foam layer 6. In other words, the second foam layer 40 has similar characteristics to the first foam layer 6. The second foam layer 40 thus forms part of the padding of the support element 1 with the first foam layer 6.

According to the embodiment of FIGS. 7 and 8, the cover element 8 is, for example, made and pre-formed before being arranged against the second forming surface 30 and applied to the first foam layer 6. More particularly, in this case, the second foam layer 40 is, for example, applied to a substrate (not shown) and is then applied to the outer surface 38 of the coating layer 34, the assembly formed by the substrate, the second foam layer 40 and the coating layer 34 being shaped to substantially show the shape of the inner surface of the support element 1 and then being placed against the second forming surface 30 of the second part 32 of the forming tool 20. During the shaping of this assembly, the second foam layer 40 is in a viscous state. The substrate is then removed prior to the application of the second foam layer 40 to the first foam layer 6 while the first and second foam layers 6 and 40 are in a viscous state. Such a method for producing the cover element 8 is, for example, described in document FR-2 934 256 and the person skilled in the art will be able to refer to this document for more details regarding these steps for pre-forming the cover element 8.

The cover element 8 is, for example, formed in an auxiliary forming tool different from the forming tool 20 or by using the second part 32 of the forming tool 20.

When the first foam layer 6 is applied to the synthetic skin 4 via the second part 32 of the forming tool 20, as described with reference to FIG. 5, the first foam layer 6 is first applied by closing the forming tool 20, and then the second part 32 is moved away from the first part 22 in order to be able to arrange the cover element 8 against the second forming surface 30. Alternatively, the forming tool 20 includes a plurality of second parts 32, one of which is used to form the first foam layer 6 and the other of which is used to apply the cover element 8, with the second parts 32 being successively applied against the first part 22. This allows the production cycle of the support element 1 to be accelerated by performing certain steps in parallel. For example, the first foam layer 6 can be applied against the synthetic skin 4 while another second part 32 is used to receive and/or shape the cover element 8 before applying it to the first foam layer 6.

The method for producing the support element 1 described above provides a finished support element 1 with a satisfactory appearance and comfort in one cycle of operation of the forming tool 20.

According to particular embodiments, one or more functional elements may be integrated into the support element 1 during its production.

Figure 9:
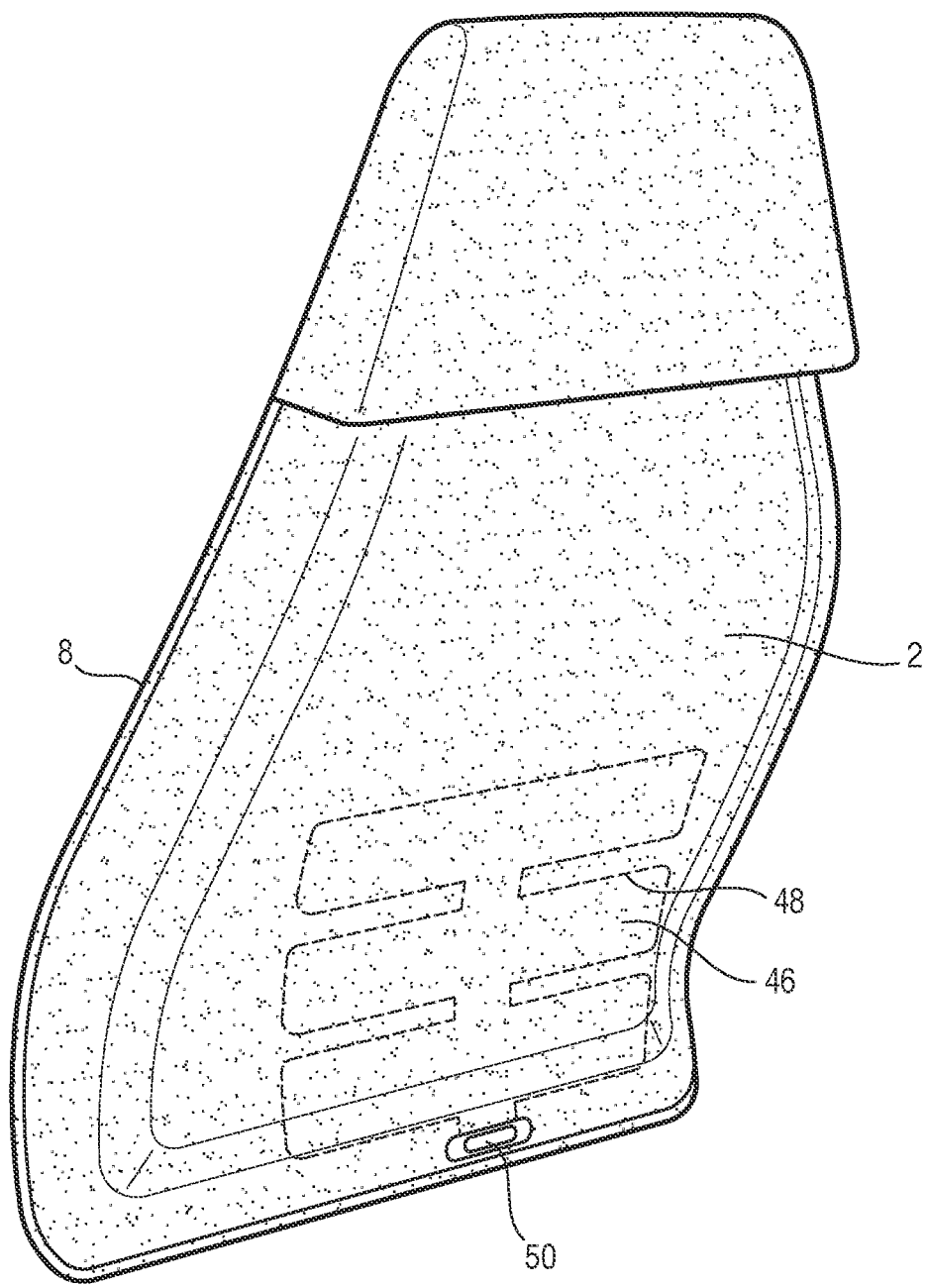
FIG. 9 is a schematic perspective representation of a support element according to another embodiment of the invention.

Thus, as shown in FIG. 9, the functional element is, for example, a film 46 forming at least one pocket 48 defining an internal volume. The film includes an opening 50, opening to the exterior of the support element 1 and being in fluid communication with the pocket 48. Thus, the pocket 48 can be inflated by connecting its internal volume with a source of air, such as a pump, through the opening 50. The film 46 thus forms an inflatable element for modifying the comfort of the support element 1 for a passenger leaning against the inner surface of the support element. The film 46 extends between the first foam layer 6 and the cover element 8 and may, for example, be integrated into the support element 1 in the manner of the functional film 26, as previously described. Alternatively, the film 46 is arranged between the inner surface 18 of the first foam layer 6 and the cover element 8 prior to closing the implementation tool 20 while the first foam layer 6 is already formed. The film 46 may be arranged to remain permanently in the support element 1 or to degrade upon closure of the forming tool 20, for example by melting, such that the pocket(s) are formed directly in the foam of the support element 1.

Figure 10:
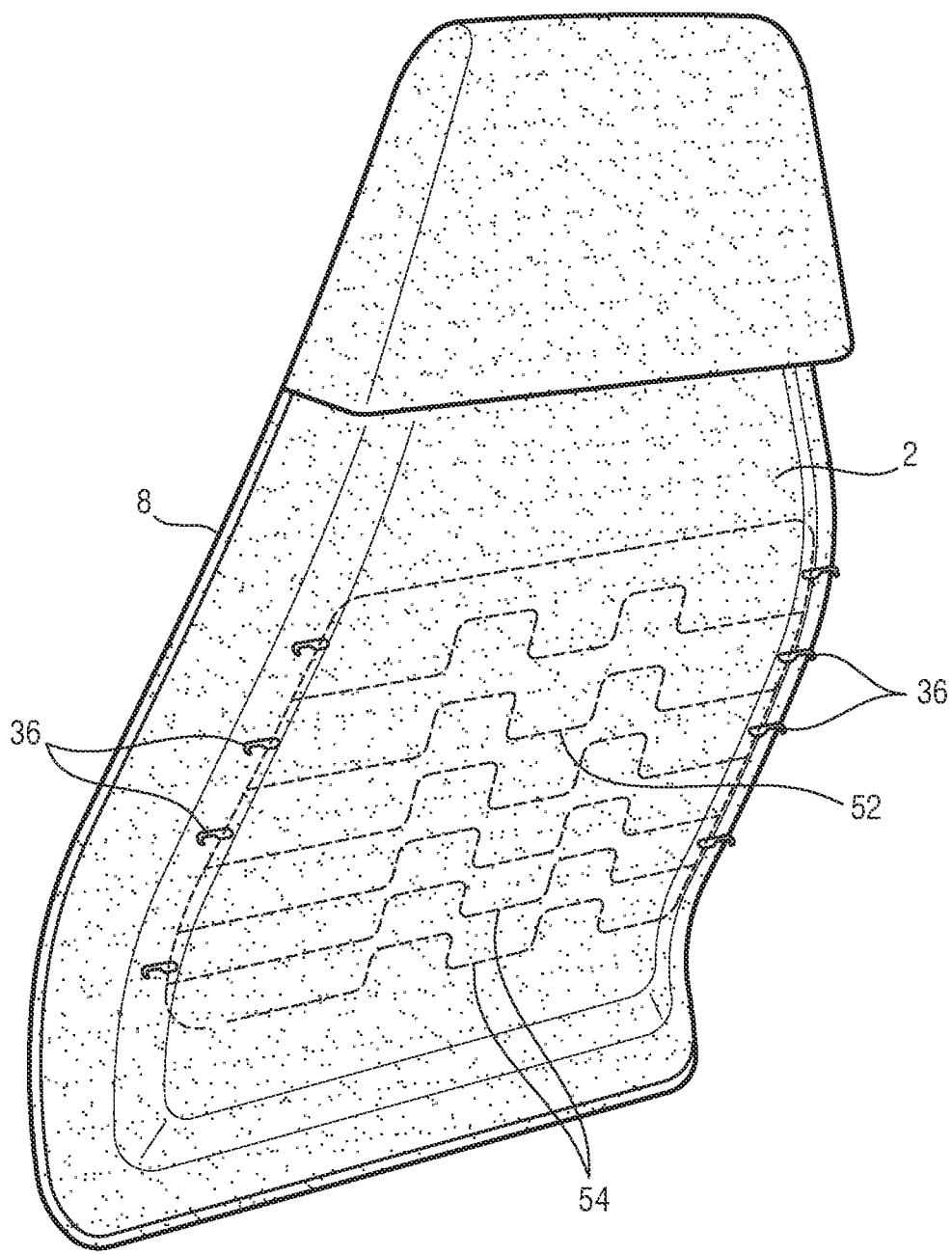
FIG. 10 is a schematic perspective representation of a support element according to another embodiment of the invention.
Figure 11:
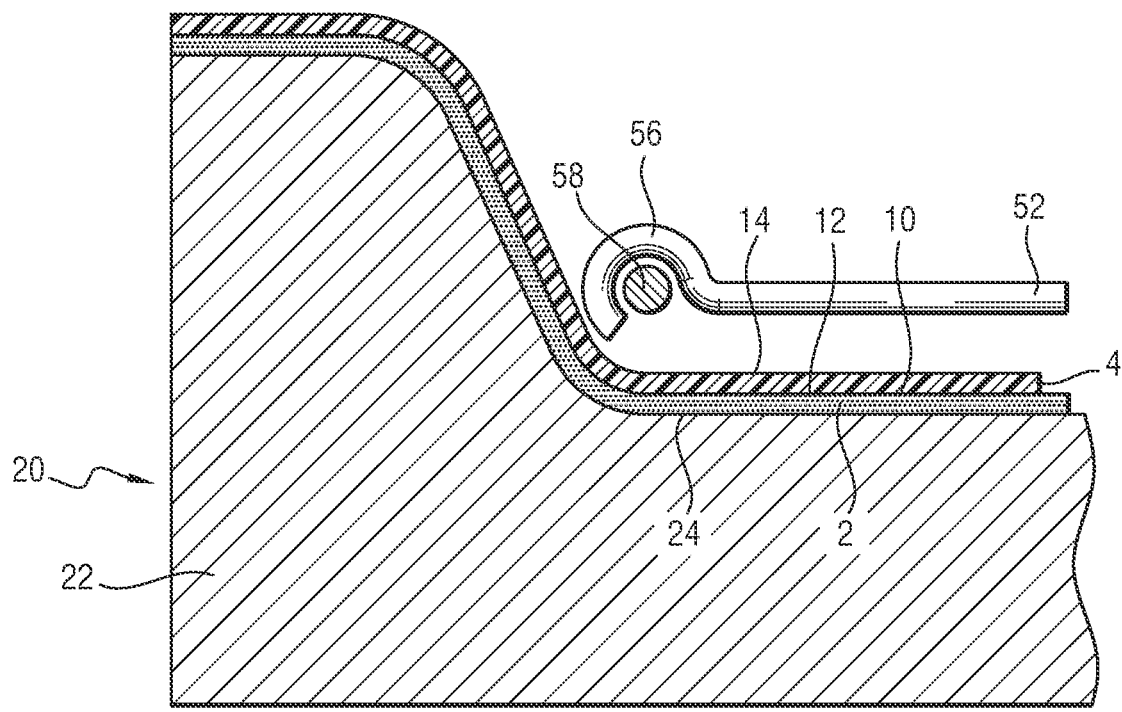
FIG. 11 is a schematic cross-sectional representation of a portion of a forming tool for producing a support element according to FIG. 10.

Alternatively, or additionally and as shown in FIG. 10, the functional element is a suspension frame 52 extending into the first foam layer 6. Such a frame 52 also allows for improved comfort of a passenger leaning against the inner surface of the support element 1. The frame 52 includes, for example, a plurality of resilient metal slats 54 extending across the support element 1. The metal slats 54 are, for example, provided with hooks 56 at their ends for securing the frame 52 to the first part 22 of the forming tool 20, as shown in FIG. 11. To this end, the first part 22 includes anchoring means 58 for anchoring the hooks 56 to the first forming surface 24. The hooks 56 are secured to the anchoring means 58 for positioning the frame 52 in the forming tool 20. The frame 52 is attached to the first forming surface 24 after the outer layer 2 and the synthetic skin 4 are applied to the first forming surface 4. The first foam layer 6 is then formed on the synthetic skin 4 and on the frame 52 by spraying, for example, as previously described. In other words, the frame 52 is over-molded by the first foam layer 6, which allows it to be integrated into the support element 1 during the production thereof.

Thus, the above-described production method allows for a finished support element 1 integrating several functionalities in one cycle of operation of the forming tool.

The invention claimed is:

1. A production method for producing a vehicle seat comprising a backrest formed by a seat support element, the seat support element having an outer surface and an inner surface, the seat support element comprising an outer layer having an outer surface, wherein the outer surface of the outer layer forms the outer surface of the seat support element, and the outer layer having an inner surface opposite the outer surface of the outer layer, the outer surface of the seat support element forming a back of the seat support element and the inner surface of the seat support element configured to accommodate a passenger, the seat support element further comprising a synthetic skin of synthetic material extending over the inner surface of the outer layer, and a first foam layer extending over the synthetic skin, the method comprising the following steps:
    forming the outer layer by applying at least one layer of paint against a first forming surface of a forming tool, said first forming surface having the shape of the outer surface of the seat support element to be formed,
    applying the synthetic skin to the inner surface of the outer layer, the synthetic skin being made of a water-free synthetic material, wherein the synthetic skin, with the at least one layer of paint, forms a rigid shell for the outer layer forming the outer surface of the seat support element, and
    applying the first foam layer to an inner surface of the synthetic skin, wherein the first foam layer has a formulation containing water and a foaming catalyst at the time of its application to the synthetic skin, wherein the first foam layer is formed on a functional film prior to the application of the first foam layer to the synthetic skin, the assembly formed by said first foam layer and by said functional film being applied against the inner surface of the synthetic skin.

2. The production method according to claim 1, wherein the synthetic material of the synthetic skin is a substantially non-cellular polyurethane and the first foam layer is a cellular polyurethane foam.

3. The production method according to claim 1, wherein the functional film is a transfer film, the first foam layer being sprayed onto said transfer film so that an inner surface of said first foam layer extends over the transfer film, the assembly formed by the first foam layer and the transfer film being applied against the synthetic skin so that an outer surface of the first foam layer extends over the inner surface of the synthetic skin, the transfer film being removed after the outer surface of the first foam layer has been applied to the inner surface of the synthetic skin.

4. The production method according to claim 1, wherein a layer of a release agent is applied against the first forming surface prior to the application of the paint layer to said first forming surface.

5. The production method according to claim 1, wherein the first foam layer is applied against the inner surface of the synthetic skin while said synthetic skin and/or said first foam layer are in a viscous state.

6. The production method according to claim 1, wherein the paint layer, the synthetic skin and/or the first foam layer are applied by spraying.

7. The production method according to claim 6, wherein the paint layer is applied by spraying on the first forming surface, and then the synthetic skin is applied by spraying on the paint layer.

8. The production method according to claim 1, further comprising the application of a second forming surface of the forming tool on the side of an inner surface of the first foam layer, said second forming surface having the shape of the inner surface of the support element to be made, said support element being formed between the first forming surface and the second forming surface in a closed position of the forming tool.

9. The production method according to claim 8, the support element further comprising a cover element extending over the inner surface of the first foam layer and forming the inner surface of the seat support element, the method comprising the following steps:
   applying the cover element against the second forming surface of the forming tool before fully closing the forming tool,
   closing the forming tool so as to apply the cover element against the first foam layer in a viscous state so as to bond the cover element and the first foam layer in the forming tool.

10. The production method according to claim 9, wherein the cover element is held against the second forming surface of the forming tool by suction against the second forming surface and/or wherein the outer layer is held against the first forming surface by suction against the first forming surface.

11. The production method according to claim 9, wherein the cover element comprises at least one coating layer of a textile, skin or synthetic material, said coating layer forming the inner surface of the seat support element.

12. The production method according to claim 11, comprising a step of forming the cover element prior to its application to the second forming surface of the forming tool, wherein a second foam layer is applied to a substrate and then is applied to an outer surface of the coating layer, the assembly formed by the substrate, the second foam layer and the coating layer being shaped to substantially conform to the shape of the inner surface of the seat support element and then placed against the second forming surface of the forming tool, the substrate being removed prior to the application of the second foam layer to the first foam layer.

13. The production method according to claim 12, wherein the second foam layer is in a viscous state during the forming of the assembly formed by the substrate, the second foam layer, and the coating layer and during the application of the second foam layer to the first foam layer.

14. The production method according to claim 9, wherein a functional element is placed in the forming tool so as to extend into the first foam layer and/or between the first foam layer and the cover element when the forming tool is closed.

15. The production method according to claim 14, wherein the functional element is a suspension frame extending into the first foam layer, said suspension frame being attached to the first forming surface prior to the application of the first foam layer to the inner surface of the synthetic skin.

16. The production method according to claim 14, wherein the functional element is a film forming at least one pocket defining an internal volume, said film extending between the first foam layer and the cover element, said film including an opening to the exterior of the seat support element and being in fluid communication with the pocket such that the pocket can be inflated by introducing air into the inner volume through the opening.

17. A production method for producing a vehicle seat comprising a backrest formed by a seat support element, the seat support element having an outer surface and an inner surface, the seat support element comprising an outer layer having an outer surface, wherein the outer surface of the outer layer forms the outer surface of the seat support element, and the outer layer having an inner surface opposite the outer surface of the outer layer, the outer surface of the seat support element forming a back of the seat support element and the inner surface of the seat support element configured to accommodate a passenger, the inner surface being formed by a cover element, the seat support element further comprising a synthetic skin of synthetic material extending over the inner surface of the outer layer, and a first foam layer extending over the synthetic skin, the method comprising the following steps:
   forming the outer layer by applying at least one layer of paint against a first forming surface of a forming tool, said first forming surface having the shape of the outer surface of the seat support element to be formed,
   applying the synthetic skin to the inner surface of the outer layer, the synthetic skin being made of a water-free synthetic material, wherein the synthetic skin, with the at least one layer of paint, forms a rigid shell for the outer layer forming the outer surface of the seat support element,
   applying the first foam layer to an inner surface of the synthetic skin, wherein the first foam layer has a formulation containing water and a foaming catalyst at the time of its application to the synthetic skin, wherein the first foam layer is formed on a functional film prior to the application of the first foam layer to the synthetic skin, the assembly formed by said first foam layer and by said functional film being applied against the inner surface of the synthetic skin,
   applying the cover element against a second forming surface of the forming tool before fully closing the forming tool, and
   closing the forming tool so as to apply the cover element against the first foam layer in a viscous state so as to bond the cover element and the first foam layer in the forming tool.

18. A production method for producing a vehicle seat comprising a backrest formed by a seat support element, the seat support element having an outer surface and an inner surface, the seat support element comprising an outer layer having an outer surface, wherein the outer surface of the outer layer forms the outer surface of the seat support element, and the outer layer having an inner surface opposite the outer surface of the outer layer, the outer surface of the seat support element forming a back of the seat support element and the inner surface of the seat support element configured to accommodate a passenger, the seat support element further comprising a synthetic skin of synthetic material extending over the inner surface of the outer layer, a first foam layer extending over the synthetic skin, and a cover element extending over an inner surface of the first foam layer and forming the inner surface of the seat support element, wherein the cover element comprises at least one coating layer of a textile, skin or synthetic material, said coating layer forming the inner surface of the seat support element, the method comprising the following steps:
   forming the outer layer by applying at least one layer of paint against a first forming surface of a forming tool, said first forming surface having the shape of the outer surface of the support element to be formed, applying the synthetic skin to the inner surface of the outer layer, the synthetic skin being made of a water-free synthetic material, wherein the synthetic skin, with the at least one layer of paint, forms a rigid shell for the outer layer forming the outer surface of the seat support element, applying the first foam layer to an inner surface of the synthetic skin, wherein the first foam layer has a formulation containing water and a foaming catalyst at the time of its application to the synthetic skin, forming the cover element by applying a second foam layer to a substrate which is then applied to an outer surface of the coating layer, the substrate being removed prior to the application of the second foam layer to the first foam layer, applying a second forming surface of the forming tool on the side of the inner surface of the first foam layer, said second forming surface having the shape of the inner surface of the support element to be made, said seat support element being formed between the first forming surface and the second forming surface in a closed position of the forming tool, applying the cover element against the second forming surface of the forming tool before fully closing the forming tool, with the substrate, the second foam layer and the coating layer being shaped to substantially conform to the shape of the inner surface of the seat support element before being placed against the second forming surface of the forming tool, and closing the forming tool so as to apply the cover element against the first foam layer in a viscous state so as to bond the cover element and the first foam layer in the forming tool.

19. A production method for producing a vehicle seat comprising a backrest formed by a seat support element, the seat support element having an outer surface and an inner surface, the seat support element comprising an outer layer having an outer surface, wherein the outer surface of the outer layer forms the outer surface of the seat support element, and the outer layer having an inner surface opposite the outer surface of the outer layer, the outer surface of the seat support element forming a back of the seat support element and the inner surface of the seat support element configured to accommodate a passenger, the seat support element further comprising a synthetic skin of synthetic material extending over the inner surface of the outer layer, a first foam layer extending over the synthetic skin, and a cover element extending over an inner surface of the first foam layer and forming the inner surface of the seat support element, the method comprising the following steps:

forming the outer layer by applying at least one layer of paint against a first forming surface of a forming tool, said first forming surface having the shape of the outer surface of the support element to be formed, applying the synthetic skin to the inner surface of the outer layer, the synthetic skin being made of a water-free synthetic material, wherein the synthetic skin, with the at least one layer of paint, forms a rigid shell for the outer layer forming the outer surface of the seat support element, applying the first foam layer to an inner surface of the synthetic skin, wherein the first foam layer has a formulation containing water and a foaming catalyst at the time of its application to the synthetic skin, applying a second forming surface of the forming tool on the side of the inner surface of the first foam layer, said second forming surface having the shape of the inner surface of the seat support element to be made, said support element being formed between the first forming surface and the second forming surface in a closed position of the forming tool, applying the cover element against the second forming surface of the forming tool before fully closing the forming tool, wherein the cover element is held against the second forming surface of the forming tool by suction against the second forming surface and/or wherein the outer layer is held against the first forming surface by suction against the first forming surface, and closing the forming tool so as to apply the cover element against the first foam layer in a viscous state so as to bond the cover element and the first foam layer in the forming tool.

\* \* \* \* \*